United States Patent [19]
Fukutome

[11] 4,030,231
[45] June 21, 1977

[54] DEVICE FOR CAPTURING ANIMALS

[76] Inventor: Shuji Fukutome, 14-8, Kudo 2-chome, Ohji-cho, Kitakatsuragi, Nara, Japan

[22] Filed: July 8, 1976

[21] Appl. No.: 703,423

[30] Foreign Application Priority Data
July 11, 1975   Japan ................. 50-97667[U]

[52] U.S. Cl. ................................................. 43/85
[51] Int. Cl.² .................................... A01M 23/00
[58] Field of Search ............. 43/60, 62, 63, 58, 93, 43/82, 85, 86

[56] References Cited
UNITED STATES PATENTS

| 157,973 | 12/1874 | Richardson | 43/86 |
| 968,966 | 8/1910 | Miller | 43/85 |

Primary Examiner—Warner H. Camp
Attorney, Agent, or Firm—Armstrong, Nikaido & Marmelstein

[57] ABSTRACT

A pair of rectangular frame members have intermeshed elongated members joining the long sides of the frames, the frames are pivotally mounted to a base member so that in the set position of the trap the frames and base together form a hollow triangular animal case, a trigger member releasably secures the frames in the set position, and spring means bias the frames to an overlapping folded position on the base member.

1 Claim, 2 Drawing Figures

DEVICE FOR CAPTURING ANIMALS

The present invention relates to improvements in a device for capturing animals, for example, rats.

The present invention is described in the following by way of example by referring to the accompanying drawings, in which:

FIG. 1 is a perspective view of an embodiment of a capturing device in accordance with the present invention, showing a manner where the pressing members are retained in the up-position thereof; and FIG. 2 is a side view of FIG. 1, showing a manner where the pressing members fall down to the downposition thereof after the lock has been released.

DETAILED DESCRIPTION OF THE INVENTION

Figure 2:
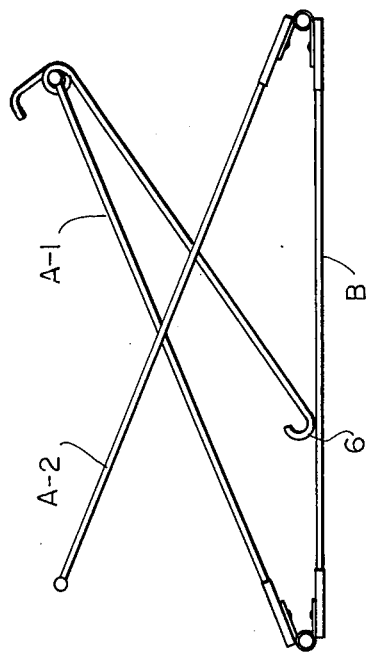

Referring now to the drawings, a pair of pressing members A-1 and A-2 are symmetrical, and each comprises a rectangular frame 1 and a plurality of parallel elongated pieces 2 disposed therein along and at right angles to the opposite longer sides of the rectangular frame 1.

The elongated pieces 2 of one pressing member are disposed in such a manner to be between the elongated pieces of another pressing member, so that the pressing members are not to be separated from each other at one longer side of each thereof.

Each of the pressing members A-1 and A-2 is pivotally mounted to each of the opposite longer sides of a base member B, and is adapted to normally fall down to the down-position thereof through the intermediary of coil springs 4 provided at pivotally supporting portions 3.

Figure 1:
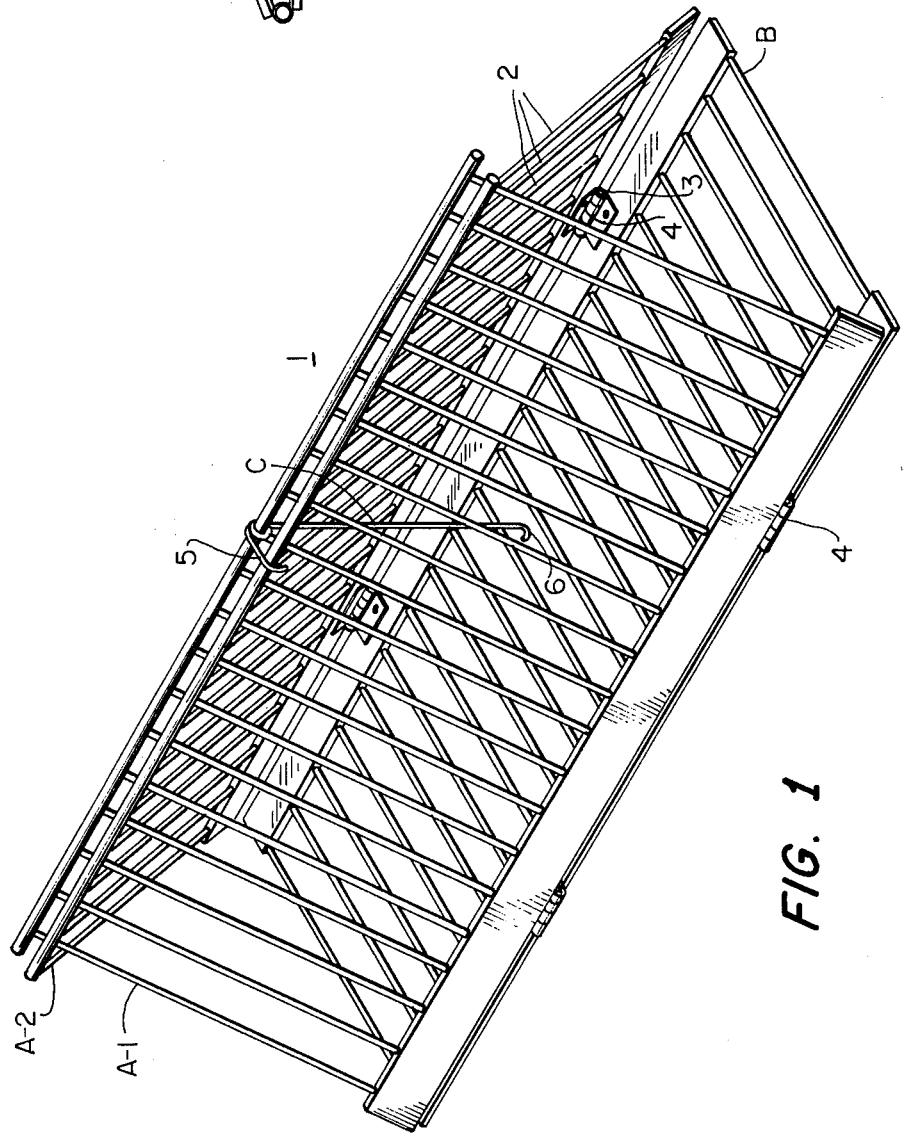

A lock member C retains the pressing members A-1 and A-2 in the up-position thereof, and, on the other hand, carries a bait. The lock member C has hook portion 6 formed at its lower end and a downwardly turned hook portion 5 formed at its upper end. An intermediate ring portion pivotally fitted in at the center of the upper side of the frame 1 of the pressing member A-1, and the downwardly turned hook portion 5 hooks the upper side of the frame 1 of the pressing member A-2, whereby both upper sides of the frames 1 are releasably joined with the pressing members A-1 and A-2 retained in the up-position thereof, as shown in FIG. 1.

In such a position, the pressing members are retained in the up-position thereof in the form of gable roof, and forms a horizontally hollow triangular case, together with the base member B.

When animals, for example, rats enter said horizontally hollow triangular case and take the bait humg down from the lower hook portion 6, the lock member C is swung, thus causing the upper hook portion 5 to be released, whereby the pressing members A-1 and A-2 fall down by means of the resiliency of the coil springs 4 provided at the pivotally supporting portions 3.

It will be noted that the lock mechanism may be provided in a different form other than that described hereinbefore. For example, the lock mechanism may be arranged in such a manner to be released just by means of the contacts and weights of animals when animals pass through the horizontally hollow triangular case.

The capturing device in accordance with the present invention constructed as described hereinbefore comprises a pair of pressing members facing each other, each having a rectangular frame and a plurality of parallel elongated pieces disposed therein, the parallel elongated pieces of one pressing member being disposed in such a manner as to be between the parallel elongated pieces of another pressing member, so that the pressing members are adapted to fall down in overlapping relationship with each other, thus the pressing effect on animals, whereby the animals cannot easily get out of the capturing device.

On the other hand, because the capturing device in accordance with the present invention is set in the form of a horizontally hollow triangular case, gives the appearance to animals that they may be able to pass therethrough, so that the animals may enter the capturing device without precaution.

The base member B may be provided in the same form as the pressing members, as shown in FIG. 1. In such a construction, when animals are caught in the trap of this capturing device, their walking limbs may get between the elongated pieces of the base member B, while the animals are being pressed by the pressing members, thus making it impossible for the animals get out of this capturing device, even though pressing force of the pressing members is relatively small.

What I claim is:

1. A device for capturing animals comprising:
   a pair of pressing members facing each other, each having a rectangular frame and a plurality of parallel elongated pieces therein disposed along and at right angles to the opposite longer sides of said rectangular frame,
   said parallel elongated pieces of one pressing member being disposed so as to be between the parallel elongated pieces of another pressing member, whereby said pressing members are not to be separated from each other at one longer side of each thereof;
   a base member to which said pressing members are pivotally mounted at pivotally supporting portions thereof, so that said pressing members are adapted to form a gable roof at the up-position thereof and are adapted to normally fall down by means of springs provided at said pivotally supporting portions; and
   suitable locking means for retaining said pressing members in the up-position thereof in the form of gable roof and adapted to release said pressing members from said up-position thereof when animals contact said locking means while either passing through the hollow triangular case path formed with said pressing members and said base member, or taking a bait preset therein.

* * * * *